(12) United States Patent
Kato et al.

(10) Patent No.: US 7,409,605 B2
(45) Date of Patent: Aug. 5, 2008

(54) STORAGE SYSTEM

(75) Inventors: Shinichi Kato, Hadano (JP); Hidehiro Nagaya, Odawara (JP)

(73) Assignee: Hitachi, Ltd., Tokyo (JP)

( * ) Notice: Subject to any disclaimer, the term of this patent is extended or adjusted under 35 U.S.C. 154(b) by 543 days.

(21) Appl. No.: 11/114,198

(22) Filed: Apr. 26, 2005

(65) Prior Publication Data

US 2006/0184820 A1 Aug. 17, 2006

(30) Foreign Application Priority Data

Feb. 15, 2005 (JP) ............................. 2005-037845

(51) Int. Cl.
G06F 11/00 (2006.01)
(52) U.S. Cl. ........................................ 714/57
(58) Field of Classification Search .................. 714/57
See application file for complete search history.

(56) References Cited

U.S. PATENT DOCUMENTS

| | | | | |
|---|---|---|---|---|
| 5,090,014 | A * | 2/1992 | Polich et al. ................... 714/26 |
| 5,237,677 | A * | 8/1993 | Hirosawa et al. .............. 714/57 |
| 5,790,775 | A * | 8/1998 | Marks et al. .................... 714/9 |
| 6,052,797 | A * | 4/2000 | Ofek et al. ...................... 714/6 |
| 6,748,432 | B1 | 6/2004 | Du et al. |
| 6,823,482 | B2 * | 11/2004 | Ahrens et al. .................. 714/57 |
| 6,944,800 | B2 * | 9/2005 | Brundridge et al. ........... 714/48 |
| 7,103,808 | B2 * | 9/2006 | Kitamorn et al. .............. 714/44 |
| 7,139,940 | B2 * | 11/2006 | Arbeitman et al. ............ 714/57 |
| 7,203,930 | B1 * | 4/2007 | Kirkpatrick et al. ......... 717/125 |
| 7,213,176 | B2 * | 5/2007 | Banko .......................... 714/38 |
| 7,281,172 | B2 * | 10/2007 | Chujo .......................... 714/48 |

(Continued)

FOREIGN PATENT DOCUMENTS

EP 1 296 244 A2 8/2002

(Continued)

OTHER PUBLICATIONS

"IEEE Standard Glossary of Software Engineering Terminology", Standards Coordinating Committee of the Computer Society of the IEEE, Sep. 28, 1990, pp. 1-83.

(Continued)

*Primary Examiner*—Bryce P. Bonzo
*Assistant Examiner*—Neil D Miles
(74) *Attorney, Agent, or Firm*—Reed Smith LLP; Stanley P. Fisher, Esq.; Juan Carlos A. Marquez, Esq.

(57) ABSTRACT

The failure management sections of a host computer and a storage unit are connected through a failure reporting interface. When a failure occurs in the storage unit, the failure information is notified from the failure management section of the storage unit to the failure management section of the host computer through the failure reporting interface, and the failure management section of the host computer deletes the failure information detected by software in the host computer based on the failure information from the storage unit. In this manner, the management of the failure information in the storage system can be unified by the service processor of the host computer. Consequently, it becomes possible to determine whether a failure generated in a host computer is a secondary failure or tertiary failure and to show the defect part indicating information minimum necessary for the maintenance and replacement.

13 Claims, 8 Drawing Sheets

U.S. PATENT DOCUMENTS

| | | | |
|---|---|---|---|
| 2001/0049802 A1* | 12/2001 | Shigeta | 714/25 |
| 2002/0124214 A1* | 9/2002 | Ahrens et al. | 714/57 |
| 2002/0124215 A1* | 9/2002 | Austen et al. | 714/57 |
| 2002/0129305 A1* | 9/2002 | Ahrens et al. | 714/57 |
| 2003/0056155 A1* | 3/2003 | Austen et al. | 714/45 |
| 2004/0044929 A1* | 3/2004 | Chujo | 714/47 |
| 2004/0083401 A1 | 4/2004 | Furukawa et al. | |
| 2004/0205393 A1* | 10/2004 | Kitamorn et al. | 714/20 |
| 2005/0144526 A1* | 6/2005 | Banko | 714/38 |
| 2006/0112219 A1* | 5/2006 | Chawla et al. | 711/114 |
| 2006/0176897 A1* | 8/2006 | Fields et al. | 370/463 |
| 2007/0195692 A1* | 8/2007 | Hagglund et al. | 370/216 |
| 2007/0198908 A1* | 8/2007 | Kirkpatrick et al. | 715/500 |

FOREIGN PATENT DOCUMENTS

| | | |
|---|---|---|
| JP | 2003-099291 | 9/2001 |
| JP | 2004-234555 | 1/2003 |

OTHER PUBLICATIONS

"Regulation of Temporary Communication Errors Going to a Host System For Logging", IBM Technical Disclosure Bulletin, IBM Corporation, New York, US vol. 33, No. 5, Oct. 1990, p. 74.

European Search Report, dated Jun. 23, 2006, 8 pages total.

* cited by examiner

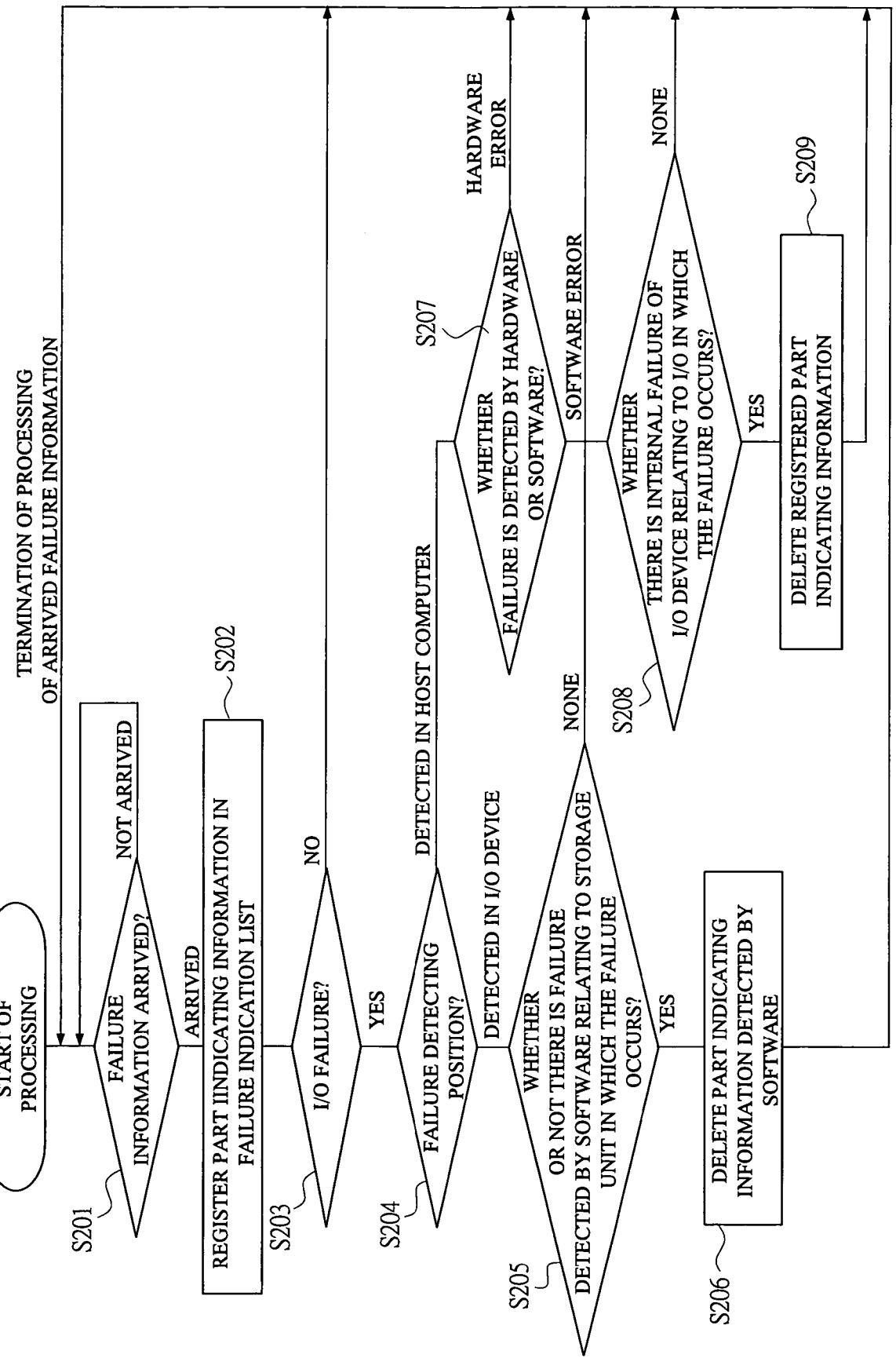

FIG. 4A

EXAMPLE OF REGISTRATION OF SERVICE PROCESSOR OF HOST COMPUTER

| CONNECTION PART | NAME OF CONNECTION DESTINATION UNIT | CONNECTION DESTINATION CLASS | IP ADDRESS |
|---|---|---|---|
| I/O INTERFACE d | STORAGE UNIT a | LOWER CALSS | xxx.xxx.xxx.xx |
| I/O INTERFACE f | STORAGE UNIT b | LOWER CALSS | xxx.xxx.xxx.xx |
| .. | | | |

FIG. 4B

EXAMPLE OF REGISTRATION OF SERVICE PROCESSOR OF STRAGE UNIT a

| CONNECTION PART | NAME OF CONNECTION DESTINATION UNIT | CONNECTION DESTINATION CLASS | IP ADDRESS |
|---|---|---|---|
| HOST INTERFACE | HOST COMPUTER a | UPPER CALSS | xxx.xxx.xxx.xx |
| .. | | | |

FIG. 4C

EXAMPLE OF REGISTRATION OF SERVICE PROCESSOR OF STRAGE UNIT b

| CONNECTION PART | NAME OF CONNECTION DESTINATION UNIT | CONNECTION DESTINATION CLASS | IP ADDRESS |
|---|---|---|---|
| HOST INTERFACE | HOST COMPUTER a | UPPER CALSS | xxx.xxx.xxx.xx |
| .. | | | |

STORAGE SYSTEM

CROSS-REFERENCE TO RELATED APPLICATION

The present application claims priority from Japanese Patent Application JP 2005-37845 filed on Feb. 15, 2005, the content of which is hereby incorporated by reference into this application.

TECHNICAL FIELD OF THE INVENTION

The present invention relates to a storage system in which a host computer and a storage unit are connected. More particularly, it relates to a technology effectively applicable to the failure recovery processing of the host computer for the failure in the storage unit.

BACKGROUND OF THE INVENTION

Conventionally, in the storage system comprised of a plurality of units such as the host computer and the storage unit, when a failure occurs in the storage unit, the failure is detected by software using a driver in the host computer, that is, the failure is detected in the plurality of units including the host computer and the storage unit.

There is known a system in which information about the failure in the storage unit is recognized in the host computer by means of the function of the web server in the storage unit (for example, Japanese Patent Application Laid-Open No.2004-234555 ).

In addition, there is also known a system in which the host computer accesses the storage unit through a file server, and a failure in the file server is informed from the storage unit to a maintenance center (for example, Japanese Patent Application Laid-Open No. 2003-99291 ).

SUMMARY OF THE INVENTION

However, since a failure is detected by software of the host computer even if the failure occurs in the storage unit, the conventional storage system comprised of a plurality of units including the host computer and the storage unit has the following problems.

(1) Since the failure which the host computer can detect is detected by software, for example, a command timeout by a driver, even for a failure inside a device of the storage unit, only the cable and the connection part connected to the device are shown as the defect indicated parts, and thus, it is impossible to distinguish the failure from a secondary failure or a tertiary failure.

(2) Since the failure information of a plurality of units such as the host computer and the storage unit is sent to a maintenance center, a person of the maintenance center needs to determine which unit parts should be replaced based on the information of the plurality of units, and therefore, it takes a long time to issue an instruction for the replacement.

(3) Since the on-site maintenance person always needs to check the failure information displayed on a management terminal such as a service processor in a plurality of units such as the host computer and the storage unit, it takes a long time to replace the failure part, and the notification of the failure condition to a customer cannot be executed in a short time.

Likewise, the systems described in Japanese Patent Application Laid-Open No. 2004-234555 and No. 2003-99291 include such a problem that the maintenance work is troublesome because the on-site maintenance person and the maintenance center person need to determine which part should be replaced by specifying the cause of the failure based on the failure contents generated from a plurality of units.

Accordingly, an object of the present invention is to provide a storage system capable of determining whether or not a failure generated in the host computer is a secondary failure or a tertiary failure by using the unified management of the failure information and capable of providing the part indicating information minimum necessary for the maintenance and replacement.

A storage system according to the present invention comprises: a host computer; and a storage unit providing a memory area to the host computer, wherein the host computer includes a failure management section for managing a failure in the host computer, a service processor for executing maintenance and management of the host computer and failure management by the failure management section of the host computer, and a processing node for controlling the host computer to communicate with the storage unit, the storage unit includes a failure management section for managing a failure of the storage unit, and a service processor for executing maintenance and management of the storage unit and failure management by the failure management section of the storage unit, and the failure management section of the host computer and the failure management section of the storage unit are connected through a failure reporting interface, and when a failure occurs in the storage unit, failure information is notified from the failure management section of the storage unit to the failure management section of the host computer through the failure reporting interface, and the failure management section of the host computer deletes failure information detected by software in the host computer based on the failure information from the storage unit, thereby unifying management of the failure information in the storage system by the service processor of the host computer.

Also, a storage system according to the present invention comprises: a host computer; and a storage unit providing a memory area to the host computer, wherein the host computer includes a failure management section for managing a failure in the host computer, a service processor for executing maintenance and management of the host computer and failure management by the failure management section of the host computer, and a processing node for controlling the host computer to communicate with the storage unit, the storage unit includes a failure management section for managing a failure of the storage unit, and a service processor for executing maintenance and management of the storage unit and failure management by the failure management section of the storage unit, and the processing node of the host computer and the failure management section of the storage unit are connected through a failure reporting interface, and when a failure occurs in the storage unit, failure information is notified from the failure management section of the storage unit to the processing node of the host computer through the failure reporting interface, and the failure management section of the host computer deletes failure information detected by software in the host computer based on the failure information notified from the storage unit to the processing node, thereby unifying management of the failure information in the storage system by the service processor of the host computer.

Further, a storage system according to the present invention comprises: a host computer; a file server connected to the host computer; and a storage unit providing a memory area to the file server, wherein the host computer includes a failure management section for managing a failure in the host computer, a service processor for executing maintenance and management of the host computer and failure management by the failure management section of the host computer, and a processing node for controlling the host computer to communicate with the storage unit, the file server includes a failure management section for managing a failure of the file server, a service processor for executing maintenance and management of the file server and failure management by the failure management section of the file server, and a processing node for controlling the file server to communicate with the storage unit, the storage unit includes a failure management section for managing a failure of the storage unit, and a service processor for executing maintenance and management of the storage unit and failure management by the failure management section of the storage unit, and the failure management section of the host computer, the failure management section of the file server, and the failure management section of the storage unit are connected through a failure reporting interface, and when a failure occurs in the storage unit, failure information is notified from the failure management section of the storage unit to the failure management section of the file server through the failure reporting interface, and the failure information is notified from the failure management section of the file server to the failure management section of the host computer through the failure reporting interface, and the failure management section of the host computer deletes failure information detected by software in the host computer based on the failure information from the file server, thereby unifying management of the failure information in the storage system by the service processor of the host computer.

BRIEF DESCRIPTIONS OF THE DRAWINGS

FIG. 3 is a flowchart showing the processing of a failure management section in a service processor of the host computer in the storage system according to the first embodiment of the present invention;

FIGS. 4A to 4C are diagrams showing the connection information between service processors in the storage system according to the first embodiment;

DESCRIPTIONS OF THE PREFERRED EMBODIMENTS

Hereinafter, embodiments of the present invention will be described in detail with reference to the accompanying drawings. Note that components having the same function are denoted by the same reference symbols throughout the drawings for describing the embodiment, and the repetitive description thereof will be omitted.

First Embodiment

<Configuration of Storage System>

Figure 1:
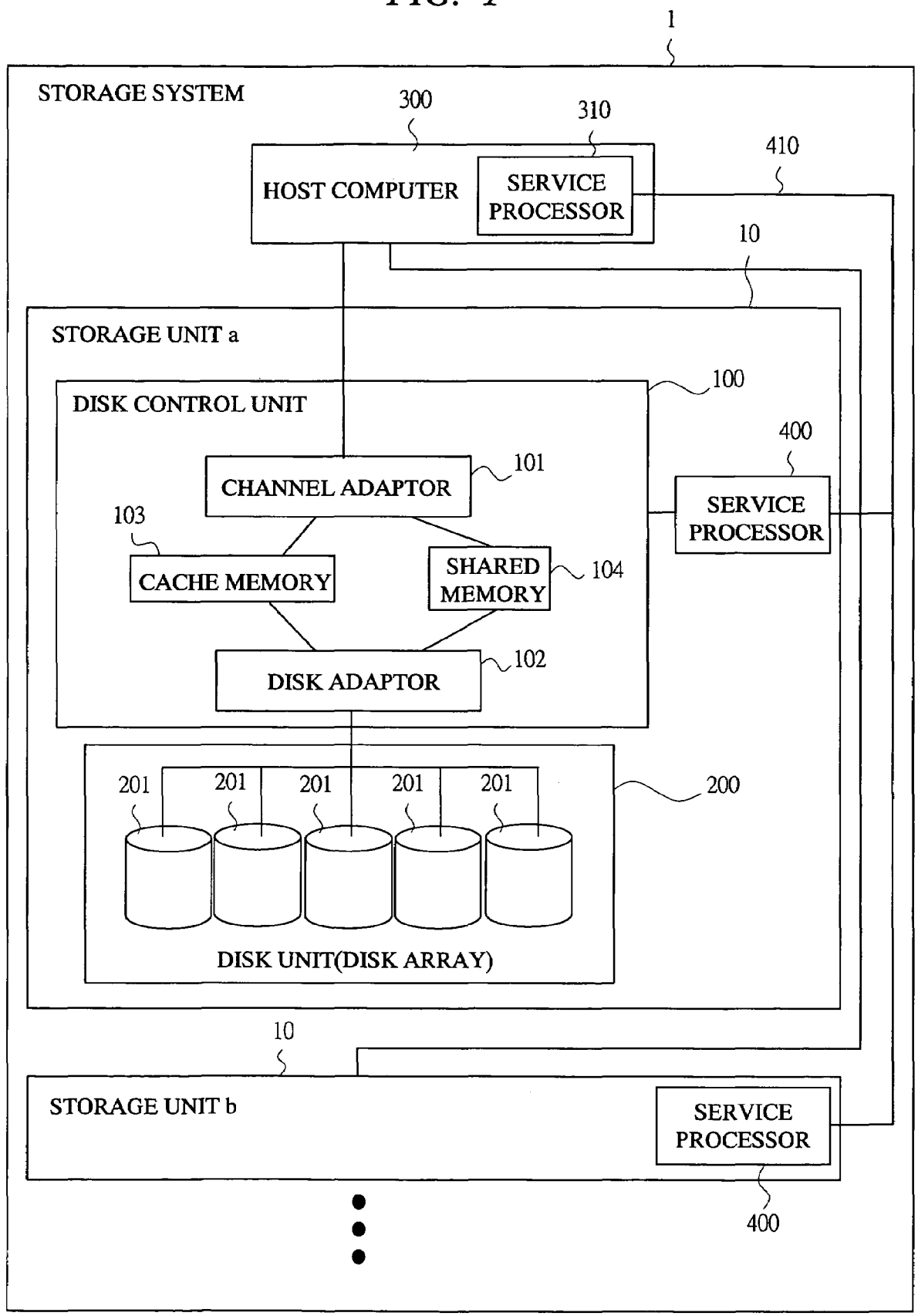
FIG. 1 is a configuration diagram showing the configuration of the storage system according to the first embodiment of the present invention.

The configuration of the storage system according to the first embodiment of the present invention will be described with reference to FIG. 1. FIG. 1 is a configuration diagram showing the configuration of the storage system according to the first embodiment of the present invention.

In FIG. 1, the storage system 1 comprises a plurality of storage units 10 and a host computer 300, and the storage unit 10 comprises a disk control unit 100 and a disk unit 200.

The disk control unit 100 comprises a channel adaptor 101, a disk adaptor 102, a cache memory 103 and a shared memory 104, and a service processor 400 is connected to the disk control unit 100.

The channel adaptor 101 is provided with a host interface which is a communication interface for communicating with the host computer (upper-level unit) 300 and exchanges data input/output command and the like with the host computer 300.

The disk adaptor 102 is communicably connected to a plurality of physical storage devices 201 for storing data and controls the disk unit 200.

The cache memory 103 temporarily stores data exchanged between the host computer 300 and the disk unit 200.

The shared memory 104 stores control information communicated by the channel adaptor 101 and the disk adaptor 102.

The service processor 400 is a computer used for the maintenance and management of the storage unit 10. By operating the service processor 400, for example, the failure information and the like can be confirmed.

The disk unit 200 includes a plurality of physical storage devices 201. Therefore, a large capacity storage area can be provided for the host computer 300. Also, the disk unit 200 constitutes, for example, redundant arrays of inexpensive disks (RAID) with a plurality of physical storage devices 201.

The host computer 300 includes a service processor 310.

The service processor 310 is a computer used for the maintenance and management of the host computer 300. By operating the service processor 310, for example, the failure information can be confirmed.

The service processor 400 of the storage unit 10 and the service processor 310 of the host computer 300 are connected to each other through a failure reporting interface 410. This interface 410 is not limited to any particular specification but general-purpose interface such as local area network (LAN) is available.

The failure information detected by the storage unit 10 is transmitted to the host computer 300 through this interface 410, and the host computer 300 gathers the failure information and sends the replacement instruction information minimum necessary for the maintenance and replacement.

<Procedure of Failure Detection Processing of Storage System>

Figure 2:
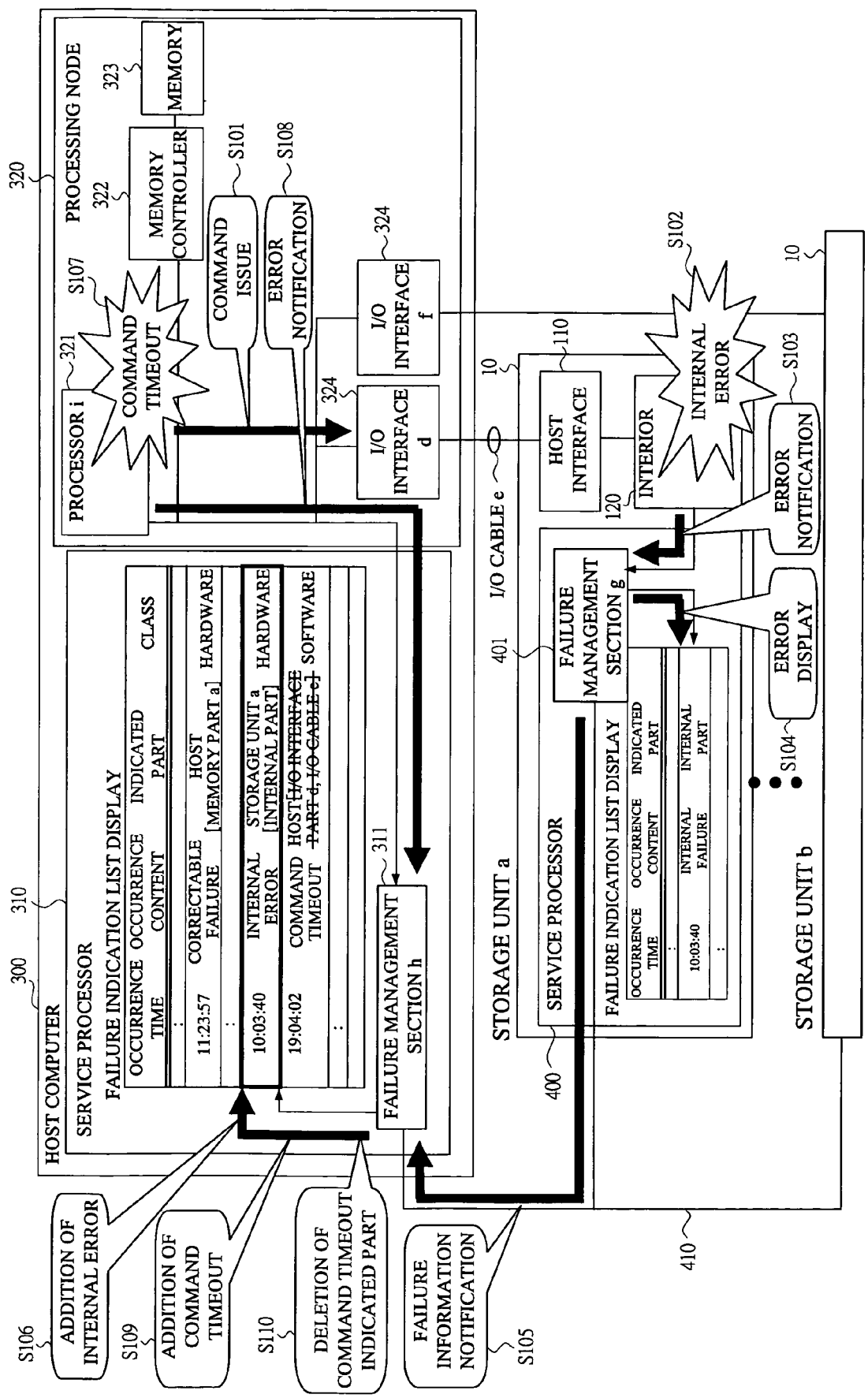
FIG. 2 is an explanatory diagram for describing the procedure of the failure detection processing of the storage system according to the first embodiment of the present invention.

Next, the procedure of the failure detection processing of the storage system according to the first embodiment of the present invention will be described with reference to FIG. 2. FIG. 2 is an explanatory diagram for describing the procedure of the failure detection processing of the storage system according to the first embodiment of the present invention.

In FIG. 2, a failure management section 401 for managing the failures in the storage unit 10 is provided in the service processor 400 of the storage unit 10, and a failure management section 311 for managing the failures in the host computer 300 is provided in the service processor 310 of the host computer 300.

Further, for the simplification of the description, the storage unit 10 comprises a service processor 400, a host interface 110 which serves as a connection section with the host computer 300 in the channel adaptor 101, and an interior 120 including all components of the storage unit 10 except the host interface 110 in the channel adaptor 101.

The host computer 300 includes a processing node 320 for executing the processing in the host computer 300, and the processing node 320 comprises a processor 321, a memory controller 322, a memory 323, and an I/O interface 324.

The memory controller 322, the memory 323, and the I/O interface 324 are controlled by the processor 321 to execute the control of data from the storage unit 10 and processing for the failure.

First, in S101, a command is issued from a processor i321 of the host computer 300 to a storage a10 through an I/O interface d324.

In S102, a failure occurs in the interior 120 of the storage unit a10, and an unrecoverable internal error which disables the processing of a command is detected. Thus, the command from the host computer 300 cannot be processed and a reply of the command to the host computer 300 is not executed.

After the occurrence of the failure in S102, the error detected in the interior 120 of the storage unit a10 is notified to a failure management section g401 in the service processor 400 in S103.

In S104, the failure management section g401 receives the notification of failure information, analyzes a defect indicated part from the failure information, and displays its result on a failure indication list of the service processor 400.

In S105, the failure management section g401 notifies the failure information to a failure management section h311 in the service processor 310 of the host computer 300 through a newly provided failure reporting interface 410. The notification content includes four kinds of information such as failure occurrence time, failure occurrence content, indicated part, and class.

In S106, the failure management section h311 receives the notification of the failure information and adds the internal error of the defect part indicating information included in the failure information to the failure indication list of the service processor 310.

On the other hand, the processor i321 of the host computer 300 issues a command to the storage unit a10. However, in S107, a timeout of a specified time is detected in the processor i321 regardless of the operation of S103 to S106.

In S108, the processor i321 notifies the failure management section h311 in the service processor 310 that the command timeout occurs in an access to the storage unit a10.

In S109, the failure management section h311 receives the failure information from the processor i321, analyzes a defect indicated part from the failure information, and displays its result on the failure indication list of the service processor 310.

In S110, the failure management section h311 confirms whether or not there is any information showing the occurrence of the internal error in the storage unit a10, which is an object for the failure registered in S109, and since such an error exists in this case, the part indicating information, in this example, the I/O interface part d324 and the I/O cable e are deleted from the registered failure information.

<Processing of Failure Management Section in Service Processor of Host Computer>

Next, the processing of the failure management section in the service processor of the host computer of the storage system according to the first embodiment of the present invention will be described with reference to FIG. 3. FIG. 3 is a flowchart showing the processing of the failure management section in the service processor of the host computer of the storage system according to the first embodiment of the present invention.

As shown in FIG. 3, the first operation of the failure management section h311 in the service processor 310 of the host computer 300 is to determine whether or not failure information has reached in S201.

If it is determined that the failure information has not reached in S201, S201 is repeated until the failure information arrives.

If it is determined that the failure information has reached in S201, the part indicating information is registered in the failure indication list in S202.

In S203, it is determined whether or not it is I/O failure, and if it is determined that it is not the I/O failure in S203, the processing of the reached failure information is terminated.

If it is determined that it is the I/O failure in S203, it is determined whether a failure detecting position is the host computer 300 or the I/O device in S204.

If it is determined that the failure detecting position is the I/O device in S204, it is determined in S205 whether or not there is a failure by the software error detection relating to the storage unit 10 in which a failure occurs.

If it is determined that there is the failure by the software error detection relating to the storage unit in which the failure occurs in S205, the part indicating information of the software error detection is deleted in S206 and the processing of the reached failure information is terminated.

If it is determined that there is no failure by the software error detection relating to the storage unit in which the failure occurs in S205, the processing of the reached failure information is terminated.

If it is determined that the failure detecting position is the host computer 300 in S204, it is determined whether hardware error or software error is detected in S207.

If it is determined that it is hardware error in S207, the processing of the reached failure information is terminated, and if it is determined that it is software error in S207, it is determined in S208 whether or not there is any internal failure in the I/O device relating to the I/O in which the failure occurs.

If it is determined that there is no internal failure in the I/O device relating to the I/O in which the failure occurs is determined in S208, the processing of the reached failure information is terminated, and if it is determined that there is any internal failure in the I/O device relating to the I/O in which the failure occurs in S208, the part indicating information registered in the processing of S202 is deleted in S209 and the processing of the reached failure information is terminated.

By executing the above-described processing by means of the failure management section 311 in the service processor 310 of the host computer 300, software error in the host computer 300 can be deleted based on the failure information from the storage unit 10. Consequently, unnecessary defect part indicating information can be eliminated and replacement instruction information minimum necessary for the maintenance and replacement can be shown.

Next, regarding the processing of the failure management section shown in FIG. 3, a specific example of notifying timing of failure detection from the host computer 300 and the storage unit 10 will be described.

First, the processing procedure of the internal error in the storage unit 10 when notified earlier than the command timeout report in the host computer 300 will be shown in the following (1) to (5).

(1) The failure notification from the storage unit 10 reaches in a failure arrival waiting state in S201 and the procedure proceeds to S202.

(2) In S202, the failure information is registered in the failure indication list and the procedure proceeds to S203. The registration content includes four kinds of information such as failure occurrence time, failure occurrence content, indicated part (including device name), and class.

(3) In the determination whether or not it is an I/O failure, since the storage unit 10 can be recognized in the part indicating information, the procedure proceeds to S204.

(4) Also in the determination of a failure detecting position, since the storage unit 10 can be recognized in the part indicating information, the procedure proceeds to S205.

(5) In S205, it is determined whether or not there is any error such as command timeout to the storage unit 10 by the software detection in the failure information list. Since there is no error in this case, the processing is terminated and the procedure proceeds to S201.

Also, the processing procedure of the command timeout in the host computer 300 when notified later than the internal error report of the storage unit 10 will be shown in the following (6) to (12).

(6) A failure notification from the storage unit 10 reaches in the failure arrival waiting state in S201, and the procedure proceeds to S202.

(7) In S202, the failure information is registered in the failure indication list and the procedure proceeds to S203. The registration content includes four kinds of information such as failure occurrence time, failure occurrence content, indicated part (including device name), and class.

(8) In the determination whether or not it is the I/O failure, since the I/O interface 324 in the host computer 300 can be recognized in the part indicating information, the procedure proceeds to S204.

(9) Also in the determination of the failure detecting position, since the host computer 300 can be recognized in the part indicating information, the procedure proceeds to S207.

(10) In the discrimination of hardware detection or software detection, since the software detection can be recognized in the class information, the procedure proceeds to S208.

(11) In S208, it is determined whether or not an internal failure of the I/O device in which the command timeout is detected is present in the failure information list. Since there is the internal failure in this case, the procedure proceeds to S209.

(12) In S209, only the part indicating information is deleted from the content registered in the failure information list. For example, when a command timeout is detected, if the failure parts are I/O interface part x and I/O interface cable which are connected to the I/O device which is an object, those two parts are deleted, and the processing is terminated, and then, the procedure proceeds to S201.

Also, the processing procedure of the internal error in the storage unit 10 when notified later than the command timeout report in the host computer 300 will be shown in the following (13) to (17).

(13) A failure notification from the storage unit 10 reaches in the failure arrival waiting state in S201, and the procedure proceeds to S202.

(14) In S202, the failure information is registered in the failure indication list, and the procedure proceeds to S203. The registration content includes four kinds of information such as failure occurrence time, failure occurrence content, indicated part (including device name), and class.

(15) In the determination whether or not it is I/O failure, since the storage unit 10 can be recognized in the part indicating information, the procedure proceeds to S204.

(16) Also in the determination of the failure detecting position, since the storage unit 10 can be recognized in the part indicating information, the procedure proceeds to S205.

(17) In S205, it is determined whether or not there is any error such as command timeout to the storage unit 10 by software detection in the failure information list. In this case, if retrieving through the failure information list, since there is the part indicating information of the I/O interface 324 relating to the storage unit 10, this is deleted. For example, when a command timeout is detected, if the failure parts are I/O interface part x and I/O interface cable relating to the I/O device which is an object, those two parts are deleted, and the processing is terminated, and then, the procedure proceeds to S201.

Also, the processing procedure of a command timeout in the host computer 300 when notified earlier than the internal error report of the storage unit 10 will be shown in the following (18) to (23).

(18) A failure notification from the storage unit 10 reaches in the failure arrival waiting state in S201, and the procedure proceeds to S202.

(19) In S202, the failure information is registered in the failure indication list and the procedure proceeds to S203. The registration content includes four kinds of information such as failure occurrence time, failure occurrence content, indicated part (including an device name), and class.

(20) In the determination whether or not it is I/O failure, since I/O interface in the host computer 300 can be recognized in the part indicating information, the procedure proceeds to S204.

(21) Also in the determination of the failure detecting position, since the host computer 300 can be recognized in the part indicating information, the procedure proceeds to S207.

(22) In the discrimination of hardware detection or software detection, since the software detection can be recognized in the class information, the procedure proceeds to S208.

(23) In S208, it is determined whether or not there is an internal failure of the I/O device in which a command timeout is detected in the failure information list. Since there is no such failure in this case, the processing is terminated and the procedure proceeds to S201.

<Information of Connection between Service Processors of Storage System>

Next, the information of connection between the service processors of the storage system according to the first embodiment of the present invention will be described with reference to FIG. 4. FIG. 4 is a diagram showing the information of connection between the service processors of the storage system according to the first embodiment. FIG. 4A shows an example of registration of the service processor 310 of the host computer 300, FIG. 4B shows an example of registration of the service processor 400 of the storage unit a10, and FIG. 4C shows an example of registration of the service processor 400 of the storage unit b10.

According to this embodiment, a failure reporting interface 410 is provided between the service processor 310 of the host computer 300 and the service processor 400 of one or more storage units 10. For the exchange through the LAN interface, however, it is necessary to register the connection information including IP address of a mate in advance as shown in FIG. 4, and the failure information is exchanged.

A specific example of the connection based on the registration example of the connection information in FIG. 4 will be described. In the service processor 310 of the host computer 300 shown in FIG. 4A, since it is found that the connection part when the failure occurs is the I/O interface d324 and the name of a connection destination unit is a storage unit a from the registration information shown in FIG. 4A, as means for confirming whether or not there is any information showing the occurrence of an internal failure in the storage unit a10 which is an object for the failure registered in S110 of FIG. 2, it is determined whether or not the storage unit a exists in the device name of a indicated part in the failure indication list.

Further, since it must be determined whether or not the notification to the other units is necessary when a failure occurs in the host computer 300, a connection destination class is provided as the determination information thereof. This connection destination class shows whether or not there exists an upper-level device which needs to be informed of the failure in its own system. Since there exists only lower level devices in the example shown in FIG. 4A, the failure notification is unnecessary.

In the service processor 400 of the storage unit a10 and the storage unit b10 shown in FIGS. 4B and 4C, the failure information is notified to the failure management section h311 in the service processor 310 of the host computer 300 in S105 of FIG. 2, and its notification destination is determined with reference to the connection destination class information.

Since the upper-level host computer a exists in the connection destination class in this example, the failure information is notified to the host computer by using the IP address information each time when the failure occurs.

For example, if there exist a plurality of upper-level connection destination classes, the failure management section g401 in the service processor 400 of the storage unit 10 determines which operation of the connection part of the upper-level class is influenced by the content of the failure and notifies only an influenced upper-level unit of the failure information. If it is impossible to determine whether or not the operation of the connection section is influenced, the failure information is notified to all the upper-level units.

According to this embodiment, since the management of the failure information in the storage unit 10 is unified in the service processor 310 of the host computer 300, a maintenance person and a person of a maintenance center do not need to check the failure information of a plurality of units, and thus, the time required for the maintenance and operation can be reduced. Further, since the unnecessary defect part indicating information can be eliminated, the requirement can be satisfied by replacing only the minimum necessary parts.

Second Embodiment

According to the second embodiment, the connection between the service processor 400 of the storage unit 10 and the service processor 310 of the host computer 300 through a failure reporting interface 410 of the first embodiment is replaced with the connection between the service processor 400 of the storage unit 10 and the I/O interface 324 of the processing node 320 of the host computer 300 through the failure reporting interface 410, and the failure information from the failure management section 401 of the storage unit 10 is written to the memory 323 in the processing node 320 of the host computer 300.

The configuration of the storage system 1 of the second embodiment is the same as that of the first embodiment except that the service processor 400 of the storage unit 10 and the I/O interface 324 of the processing node 320 of the host computer 300 are connected through the failure reporting interface 410.

<Procedure of Failure Detection Processing of Storage System>

Figure 5:
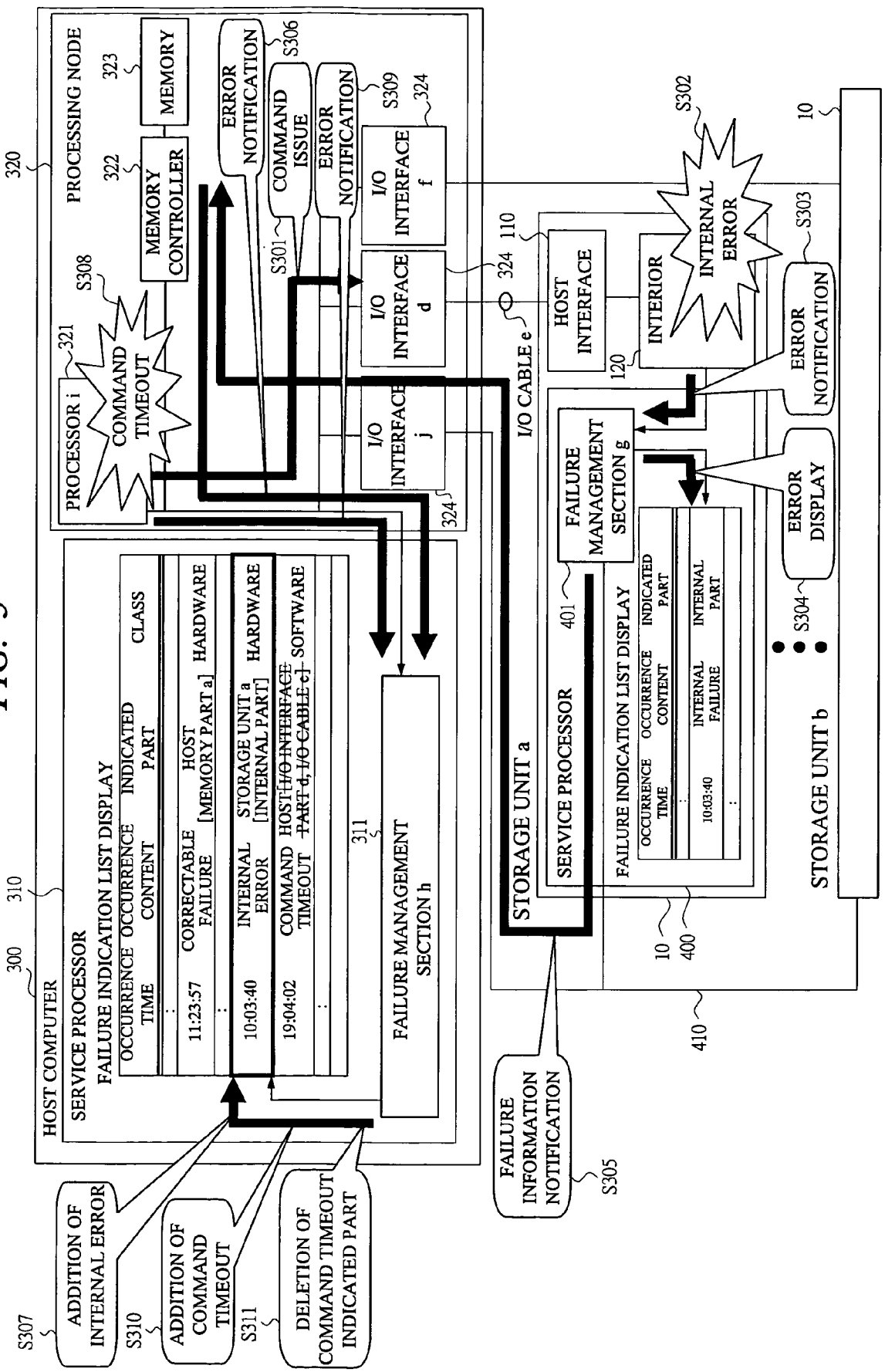
FIG. 5 is an explanatory diagram for describing the procedure of the failure detection processing of the storage system according to the second embodiment of the present invention.

Next, the procedure of the failure detection processing of the storage system according to the second embodiment of the present invention will be described with reference to FIG. 5. FIG. 5 is an explanatory diagram for describing the procedure of the failure detection processing of the storage system according to the second embodiment of the present invention.

In FIG. 5, the failure management section 401 in the service processor 400 of the storage unit 10 is connected to the I/O interface 324 in the processing node 320 of the host computer 300 through the failure reporting interface 410, so that the failure management section 401 in the service processor 400 of the storage unit 10 can communicate with the processing node 320 of the host computer 300.

First, a command is issued from the host computer 300 to the storage unit a10 in S301.

In S302, when a failure occurs in the interior 120 of the storage unit a10, an unrecoverable internal error which disables the processing of the command is detected. Thus, the command from the host computer 300 cannot be processed and a reply of the command to the host computer 300 is not executed.

After the occurrence of the failure in S302, the error detected in the interior 120 of the storage unit a10 is notified to the failure management section g401 in the service processor 400 in S303.

In S304, the failure management section g401 receives the notification of the failure information, analyzes a defect indicated part from the failure information, and displays its result on the failure indication list of the service processor 400.

In S305, the failure management section g401 writes the failure information to the memory 323 in the processing node 320 of the host computer 300 through the newly provided failure reporting interface 410.

In S306, when the processor i321 of the processing node 320 is notified that information is written to the memory 323 of the processor i321 by the constant polling, or at the time of the interruption to the processor i321 just after the writing, the processor i321 reads the failure information from the memory 323 and notifies the failure information to the failure management section h311 in the service processor 310. The notification content includes four kinds of information such as failure occurrence time, failure occurrence content, indicated part, and class.

In S307, the failure management section h311 receives the notification of the failure information and adds the internal error of the defect part indicating information in the failure information to the failure indication list of the service processor 310.

On the other hand, the processor i321 of the host computer 300 issues a command to the storage unit a10. However, in S308, a timeout of a specified time is detected regardless of the operation of S303 to S307.

In S309, the processor i321 notifies the failure management section h311 in the service processor 310 that the command timeout occurs in an access to the storage unit a10.

In S310, the failure management section h311 receives the notification of the failure information from the processor i321, analyzes the defect indicated part from the failure information, and displays its result on the failure indication list of the service processor 310.

In S311, the failure management section h311 confirms whether or not there is any information showing the occurrence of the internal failure in the storage unit a10, which is an object for the failure registered in S310, and since such information exists in this case, the part indicating information is deleted from the registered failure information, that is, I/O interface portion d324 and I/O cable e are deleted in this case.

According to this embodiment, since the management of the failure information in the storage unit 10 is unified in the service processor 310 of the host computer 300, a maintenance person and a person of a maintenance center do not need to check the failure information in a plurality of units. Thus, the time required for the maintenance and operation can be reduced. Further, since the unnecessary defect part indicating information can be eliminated, the requirement can be satisfied by replacing only the minimum necessary parts. Further, it is not necessary to connect the failure reporting interface 410 to the service processor 310 of the host computer 300 and the exchange of the failure information can be executed through such an interface as LAN which is connected for the operation of the processing node 320.

Third Embodiment

According to the third embodiment, the host computer 300 is connected to the storage unit 10 through a file server instead of that of the first embodiment in which it is connected directly to the storage unit 10.

The configuration of the storage system 1 of the third embodiment is the same as that of the first embodiment except that the file server is provided between the storage unit 10 and the host computer 300 and the service processor of the file server, the service processor 400 of the storage unit 10 and the service processor 310 of the host computer 300 are connected through the failure reporting interface 410.

<Procedure of Failure Detection Processing of Storage System>

Figure 6:
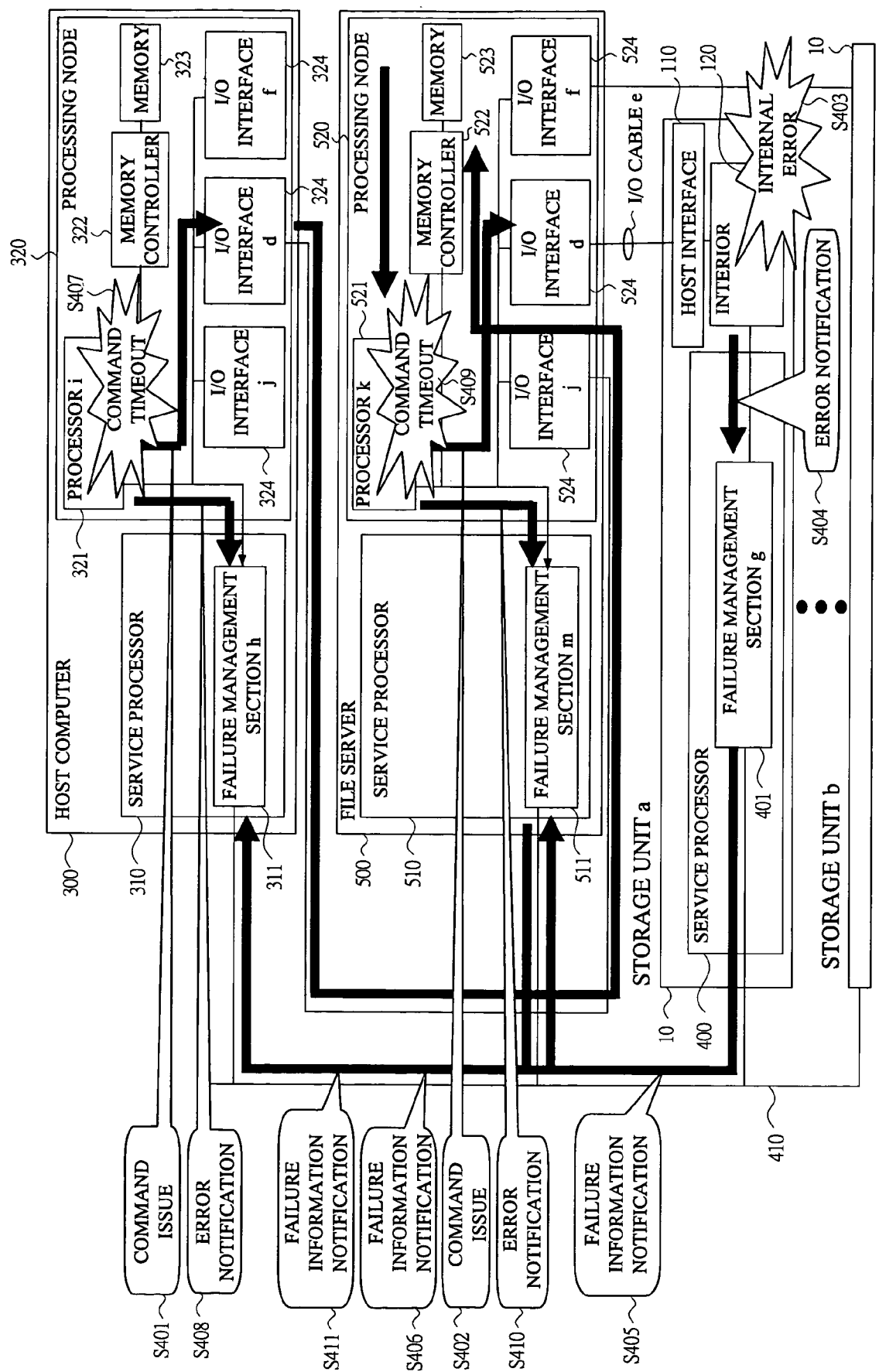
FIG. 6 is an explanatory diagram for describing the procedure of the failure detection processing of the storage system according to the third embodiment of the present invention.

Next, the procedure of the failure detection processing of the storage system according to the third embodiment of the present invention will be described with respect to FIG. 6. FIG. 6 is an explanatory diagram for describing the procedure of the failure detection processing of the storage system according to the third embodiment of the present invention.

In FIG. 6, a failure management section 511 for managing the failure in the file server 500 is provided in a service processor 510 of the file server 500.

The file server 500 is provided with a processing node 520 for executing the processing in the file server 500, and the processing node 520 is comprised of a processor 521, a memory controller 522, a memory 523, and an I/O interface 524.

The memory controller 522, the memory 523, and the I/O interface 524 are controlled by the processor 521 so as to execute the data control and failure recovery processing between the host computer 300 and the storage unit 10.

Also, the I/O interface 324 in the processing node 320 of the host computer 300 is connected to the I/O interface 524 in the processing node 520 of the file server 500, and the storage unit 10 is connected to the I/O interface 524 in the processing node 520 of the file server. In this configuration, the host computer 300 issues a command to the file server 500 to utilize the storage unit 10 through the file server 500.

First, a command is issued to the file server 500 from the processor i321 of the host computer 300 through the I/O interface d324 in S401. The command is written to the memory 523 in the file server 500 through a fiber cable or the like.

In S402, a processor k521 in the file server 500 reads the command from the memory 523 and issues the command to the storage unit a10 through the I/O interface d524.

In S403, a failure occurs in the interior 120 of the storage unit a10 and an unrecoverable internal error which disables the processing of the command is detected. Thus, the command from the file server 500 cannot be processed and a reply of this command to the file server 500 is not executed.

After the occurrence of the failure in S403, the error detected in the interior 120 of the storage unit a10 in S404 is notified to the failure management section g401 in the service processor 400. The failure management section g401 receives the notification of the failure information, analyzes the defect indicated part from the failure information, and displays its result on the failure indication list of the service processor 400.

In S405, the failure information is notified from the failure management section g401 to the failure management section m511 in the service processor 510 of the file server 500 through the newly provided failure reporting interface 410. The failure management section m511 receives the notification of the failure information and displays the defect part indicating information existing in the failure information on the failure indication list of the service processor 510.

In S406, the failure information is notified from the failure management section m511 to the failure management section h311 in the service processor 310 of the host computer 300 through the newly provided interface 410. The failure management section h311 receives the notification of the failure information and displays the defect part indicating information existing in the failure information on the failure indication list of the service processor 310.

On the other hand, the processor i321 of the host computer 300 issues a command to the file server. However, in S407, a timeout of a specified time is detected regardless of the operation of S402 to S406.

In S408, the processor i321 notifies the failure management section h311 in the service processor 310 that the command timeout occurs in an access to the file server 500. The failure management section h311 receives the failure information, analyzes the defect indicated part from the failure information, and displays its result on the failure indication list of the service processor 310. The failure management section h311 confirms whether or not there is any information showing the occurrence of the failure in the file server 500 which is an object of the registered failure, and if there is such information, the part indicating information is deleted from the registered failure information.

Further, the processor k521 in the file server 500 issues a command to the storage unit 10. However, in S409, the timeout of a specified time is detected regardless of the operation of S402 to S408.

In S410, the processor k521 notifies the failure management section m511 in the service processor 510 that a command timeout is generated in an access to the storage unit a10. The failure management section m511 receives the notification of the failure information, analyzes a defect indicated part from the failure information, and displays its result on the failure indication list. The failure management section m511 confirms whether or not there is any information showing the occurrence of the internal failure in the storage unit a10 which is an object of the registered failure, and if such information exists, the part indicating information is deleted from the registered failure information.

In S411, the failure management section m511 notifies the failure information to the failure management section h311 in the service processor 310 of the host computer 300 through the failure reporting interface 410. The failure management section h311 receives the notification of the failure information and adds the internal error of the defect part indicating information in the failure information to the failure indication list of the service processor 310. The failure management section h311 confirms whether or not there is any information showing the occurrence of the failure in the file server 500 and the storage unit a10 which are objects of a registered failure, and if such information exists, the part indicating information is deleted from the registered failure information.

As described above, according to this embodiment, by connecting the host computer 300, the file server 500, and the service processor of the storage unit 10 through a failure reporting interface so as to gather the failure information in the host computer 300, the replacement instruction information minimum necessary for the maintenance and replacement can be shown.

In the foregoing, the invention made by the inventors of the present invention has been concretely described based on the embodiments. However, it is needless to say that the present invention is not limited to the foregoing embodiments and various modifications and alterations can be made within the scope of the present invention.

According to the present invention, since the management of the failure information in the storage unit is unified in the service processor of the host computer, a maintenance person and a person of a maintenance center do not need to check the failure information from a plurality of units, the time required for the maintenance and operation can be reduced.

Further, since the unnecessary defect part indicating information can be eliminated, the requirement can be satisfied by the replacement of minimum necessary parts.

What is claimed is:

1. A storage system comprising: a host computer; and a storage unit providing a memory area to said host computer,
wherein said host computer includes a failure management section for managing a failure in said host computer, a service processor for executing maintenance and management of said host computer and failure management using said failure management section of said host computer, and a processing node for controlling said host computer to communicate with said storage unit,
said storage unit includes a failure management section for managing a failure of said storage unit, and a service processor for executing maintenance and management of said storage unit and failure management using said failure management section of said storage unit,
said failure management section of said host computer and said failure management section of said storage unit are connected through a failure reporting interface, and
when a failure occurs in said storage unit, (1) the processing node detects a timeout of said storage unit lasting for a specified time and sends out timeout information including timeout parts to said failure management section of said host computer while (2) failure information of a failed part is notified from said failure management section of said storage unit to said failure management section of said host computer through said failure reporting interface, and said failure management section of said host computer deletes each timeout part from said timeout information detected by software in said host computer that is not included in the failure information from said storage unit such that management of the failure information in said storage system is unified by said service processor of said host computer.

2. The storage system according to claim 1,
wherein each of said failure management section of said host computer and said failure management section of said storage unit has connection information showing a connection relation between said host computer and said storage unit,
said failure management section of said storage unit determines said host computer to which said failure information is notified, based on said connection information, and
said failure management section of said host computer determines a deletion object of failure information detected by software in said host computer based on said connection information.

3. The storage system according to claim 1, wherein said timeout part and said failed part are hardware components facilitating communication between the processing node of said host computer and said storage unit.

4. The storage system according to claim 1, wherein said timeout part is an I/O interface of the process node connecting to said storage unit or a I/O cable connecting the processing node to said storage unit, and said failed part is an internal part of said storage unit.

5. A storage system comprising: a host computer; and a storage unit providing a memory area to said host computer,
wherein said host computer includes a failure management section for managing a failure in said host computer, a service processor for executing maintenance and management of said host computer and failure management using said failure management section of said host computer, and a processing node for controlling said host computer to communicate with said storage unit,
said storage unit includes a failure management section for managing a failure of said storage unit, and a service processor for executing maintenance and management of said storage unit and failure management using said failure management section of said storage unit,
said processing node of said host computer and said failure management section of said storage unit are connected through a failure reporting interface, and
when a failure occurs in said storage unit, (1) the processing node detects a timeout of said storage unit lasting for a specified time and sends out timeout information including timeout parts to said failure management section of said host computer while (2) failure information of a failed part is notified from said failure management section of said storage unit to said processing node of said host computer through said failure reporting interface, and said failure management section of said host computer deletes each timeout part from said timeout information detected by software in said host computer that is not included in the failure information notified from said storage unit to said processing node such that management of the failure information in said storage system is unified by said service processor of said host computer.

6. The storage system according to claim 5,
wherein each of said failure management section of said host computer and said failure management section of said storage unit has connection information showing a connection relation between said host computer and said storage unit, said failure management section of said storage unit determines said host computer to which said failure information is notified, based on said connection information, and said failure management section of said host computer determines a deletion object of failure information detected by software in said host computer based on said connection information.

7. The storage system according to claim 5, wherein said timeout part and said failed part are hardware components facilitating communication between the processing node of said host computer and said storage unit.

8. The storage system according to claim 7, wherein said timeout part is an I/O interface of the process node connecting to said storage unit or a I/O cable connecting the processing node to said storage unit, and said failed part is an internal part of said storage unit.

9. The storage system according to claim 7, wherein said failure reporting interface is located in the processing node and is separated from the I/O interface of the process node connecting to said storage unit.

10. A storage system comprising: a host computer; a file server connected to said host computer; and a storage unit providing a memory area to said file server, wherein said host computer includes a failure management section for managing a failure in said host computer, a service processor for executing maintenance and management of said host computer and failure management using said failure management section of said host computer, and a processing node for controlling said host computer to communicate with said storage unit, said file server includes a failure management section for managing a failure of said file server, a service processor for executing maintenance and management of said file server and failure management using said failure management section of said file server, and a processing node for controlling said file server to communicate with said storage unit, said storage unit includes a failure management section for managing a failure of said storage unit, and a service processor for executing maintenance and management of said storage unit and failure management using said failure management section of said storage unit, said failure management section of said host computer, said failure management section of said file server, and said failure management section of said storage unit are connected through a failure reporting interface, and when a failure occurs in said storage unit, (1) the processing node of the host computer or the processor node of the file server detects a timeout of said storage unit lasting for a specified time and sends out timeout information including timeout parts to said failure management section of said host computer while (2) failure information of a failed part is notified from said failure management section of said storage unit to said failure management section of said file server through said failure reporting interface, and the failure information is then notified from said failure management section of said file server to said failure management section of said host computer through said failure reporting interface, and said failure management section of said host computer deletes each timeout part from said timeout information detected by software in said host computer that is not included in the failure information from said file server such that management of the failure information in said storage system is unified by said service processor of said host computer.

11. The storage system according to claim 10, wherein said timeout part and said failed part are hardware components facilitating communication between the processing node of said host computer, the processing node of said file server and said storage unit.

12. The storage system according to claim 11, wherein said timeout part is an I/O interface of the process node of the host computer connecting to the processing node of the file server, a I/O cable connecting the processing node of the host computer to the processing node of the file server, an I/O interface of the process node of the file server connecting to said storage unit, or a I/O cable connecting the processing node of the file server to said storage unit, and said failed part is an internal part of said storage unit.

13. The storage system according to claim 11, wherein said failure reporting interface is located in either the processing node of the host computer or the processing node of the file server, and said failure reporting interface is separated from the I/O interface of the process node in the host computer connecting to the processing node of the file server or the I/O interface of the process node in the file server connecting to said storage unit.

* * * * *